(12) United States Patent
Holmes et al.

(10) Patent No.: US 7,646,130 B2
(45) Date of Patent: Jan. 12, 2010

(54) STATOR SEGMENT AND METHOD OF ASSEMBLY

(75) Inventors: Alan G. Holmes, Clarkston, MI (US); Richard A. Ordo, Greenwood, IN (US); Ahmed M. El-Antably, Indianapolis, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 545 days.

(21) Appl. No.: 11/380,343

(22) Filed: Apr. 26, 2006

(65) Prior Publication Data

US 2007/0252471 A1 Nov. 1, 2007

(51) Int. Cl.
*H02K 1/12* (2006.01)
(52) U.S. Cl. .................. 310/216.007; 310/216.057; 310/216.074; 310/216.079; 310/216.109
(58) Field of Classification Search ......... 310/216–218, 310/43, 44
See application file for complete search history.

(56) References Cited

U.S. PATENT DOCUMENTS

| | | | |
|---|---|---|---|
| 4,503,368 A * | 3/1985 | Sakamoto | 310/49 R |
| 6,066,905 A | 5/2000 | Wright et al. | |
| 6,472,792 B1 | 10/2002 | Jack et al. | |
| 6,979,931 B1 * | 12/2005 | Gustafson et al. | 310/254 |
| 7,005,764 B2 * | 2/2006 | Petersen | 310/44 |
| 2004/0169433 A1 | 9/2004 | Park et al. | |
| 2005/0194845 A1 | 9/2005 | Engquist et al. | |

FOREIGN PATENT DOCUMENTS

JP        2005020815 A        1/2005

* cited by examiner

*Primary Examiner*—Dang D Le

(57) ABSTRACT

A stator assembly is provided for an electric motor having a longitudinal axis. The stator assembly includes at least one stator segment having a first end member having a stator tooth and at least one of a stator shoe and a back iron. A second end member is positioned with respect to the first end member and has a stator tooth and at least one of a stator shoe and a back iron. A winding generally circumscribes the stator tooth of the first end member and the stator tooth of the second end member. The first and second end members have a parting line generally perpendicular to the longitudinal axis of the motor. A motor incorporating the stator assembly of the present invention is disclosed. Additionally, a method of forming the stator assembly of the present invention is described.

13 Claims, 3 Drawing Sheets

STATOR SEGMENT AND METHOD OF ASSEMBLY

GOVERNMENT LICENSE RIGHTS

The U.S. Government has a paid-up license in this invention and the right in limited circumstances to require the patent owner to license others on reasonable terms as provided for by the terms of P8GAV60VN awarded by NREL/DOE.

TECHNICAL FIELD

The present invention relates to electric motors having concentrated windings formed from individual stator segments.

BACKGROUND OF THE INVENTION

Electric devices, such as motors or generators, having a stator secured within a housing are well known. A rotor mounted on a shaft is coaxially positioned within the stator and is rotatable relative to the stator about a longitudinal axis of the shaft. The passage of current through windings mounted with respect to the stator creates a magnetic field tending to rotate the rotor and shaft. Concentrated windings may be formed on individual stator segments, which are then mounted with respect to each other to form a generally annular stator assembly. The stator segments may include stator teeth, back iron, and/or stator shoes. A. G. Jack and others of the University of Newcastle on Tyne, U.K. have proposed one such design. This design forms a stator employing stator segments having end turns of the concentrated windings overlapped along the longitudinal axis of the motor by the stator shoes and the rotor. Thus, the motor is three-dimensional in nature in that the magnetic flux field passing through the concentrated windings is distributed along the longitudinal axis of the motor within the stator segments. The stator teeth, back iron, and stator shoes are typically formed from soft magnetic composite material.

SUMMARY OF THE INVENTION

A stator assembly is provided for an electric motor having a longitudinal axis. The stator assembly includes at least one stator segment having a first end member having a stator tooth and at least one of a stator shoe and a back iron. A second end member is positioned with respect to the first end member and has a stator tooth and at least one of a stator shoe and a back iron. A winding generally circumscribes the stator tooth of the first end member and the stator tooth of the second end member. The first and second end members have a parting line generally perpendicular to the longitudinal axis of the motor. The first and second end members are preferably formed from pressed powdered or flaked iron.

An intermediate member may be provided between the first and second end members. The intermediate member may be formed from one of laminated steel, pressed powdered iron, and pressed flaked iron. The winding is preferably formed from copper wire. A motor incorporating the stator assembly of the present invention is also disclosed.

A method of forming the stator assembly of the present invention is also provided. The method includes forming a winding from a wire and inserting a stator tooth of a first end member and a stator tooth of a second end member through at least a portion of the winding such that the winding is contained in a cavity. The cavity is at least partially defined by the stator tooth of the first end member and at least one of a back iron and a stator shoe of the first end member. Additionally, the cavity is at least partially defined by the stator tooth of the second end member and at least one of a back iron and a stator shoe of the second end member. The first and second end members have a parting line generally perpendicular to the longitudinal axis of the motor.

The winding may be formed by wrapping the wire around a bobbin or mandrel. Alternately, the winding may be formed by wrapping the wire around an intermediate member having first and second end dies disposed at opposite ends of the intermediate member. Subsequently, the first and second end dies are removed and a respective one of the first and second end members are inserted into the winding in place of the first and second end dies.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
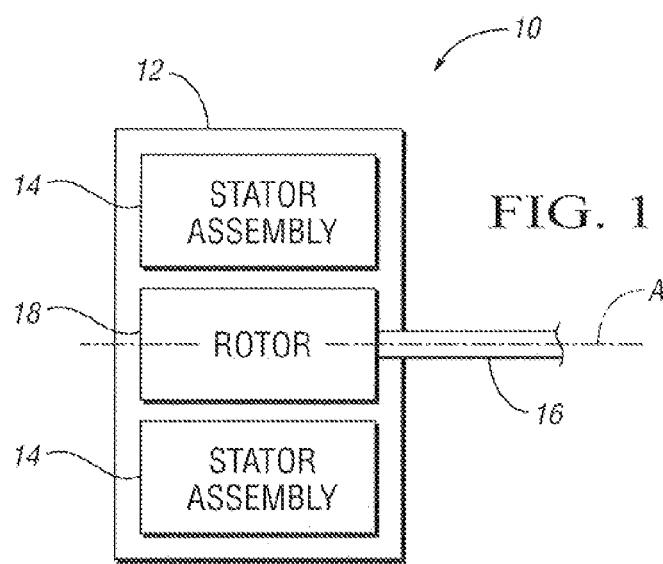
FIG. 1 is a schematic cross sectional diagram of an electric motor including a stator assembly in accordance with the present invention.

Referring to the drawings wherein like reference numbers represent the same or similar components throughout the several figures, there is shown in FIG. 1 a schematic representation of an electric motor 10. The electric motor 10 is shown for illustrative purposes in accordance with the preferred embodiment; however it should be appreciated the present invention is adapted for use with other electric motor configurations and other electrical devices such as, for example, a generator. The electric motor 10 includes a housing 12, a stator assembly 14, a shaft 16, and a rotor 18. The stator assembly 14 is substantially annular and is configured to remain stationary relative to the housing 12 during operation of the motor 10. The rotor 18 is fixed to the shaft 16 for unitary rotation therewith and is generally coaxially disposed within the stator assembly 14. The rotor 18 and shaft 16 are rotatable relative to the housing 12 and the stator assembly 14. A longitudinal axis, indicated at A, is shown in FIG. 1 and is defined as the centerline of the shaft 16 and hence the motor 10.

Figure 2:
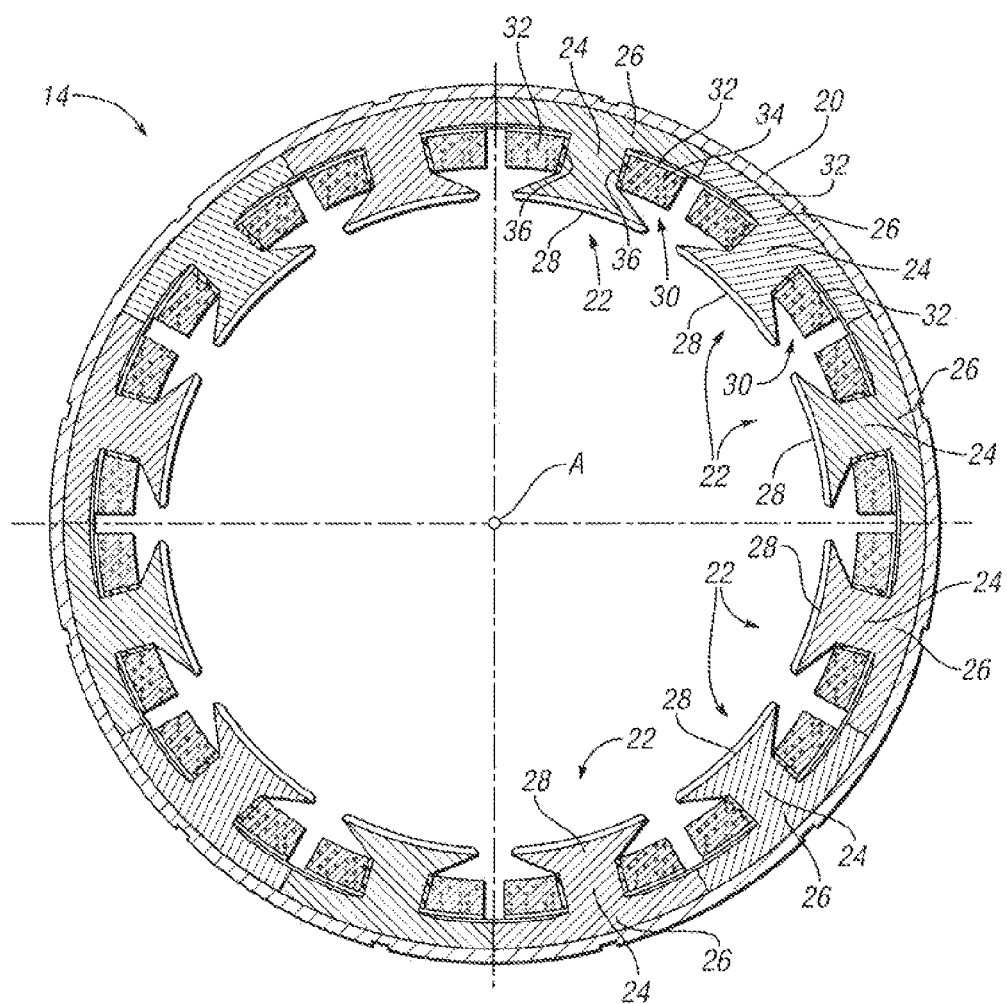
FIG. 2 is a cross sectional view of the stator assembly shown schematically in FIG. 1.

Referring to FIG. 2 a cross sectional view of the stator assembly 14 is shown. The stator assembly 14 preferably includes a stator core 20 having a plurality of stator segments 22 disposed therein. Each of the stator segments 22 include a stator tooth 24 extending generally radially inward from a back iron 26. A stator shoe 28 is disposed at the end of the stator tooth 24 opposite the back iron 26. The stator shoe 28 and back iron 26 are spaced apart from each other on the stator tooth 24 to define a cavity 30 sufficiently configured to receive concentrated windings 32. The concentrated windings 32 include a stator wire 34 wound or wrapped around each of the stator teeth 24 to at least partially fill the cavities 30. For applications where the electric motor 10 operates at a moderate to high voltage, a coating or layer of insulating material 36 may be disposed between the concentrated windings 32 and the stator tooth 24, back iron 26, and/or stator shoe 28. Those skilled in the art will recognize that the insulating material 36 may be any material possessing the requisite insulative qualities, such as plastic, lacquer, epoxy resin, etc. One or both of the stator shoe 28 and the back iron 26 may be formed integrally with the stator tooth 24 or formed separately and mounted thereto. Additionally, the back iron 26 may be segmented, as shown in FIG. 2, or may be formed integrally as a generally cylindrical tube.

The stator segments 22 are assembled into the stator core 20 to form the stator assembly 14. As shown in FIG. 2, twelve stator segments 22 are disposed within the stator core 20 to cooperate with a rotor 18 having eight, ten, or fourteen magnetic poles, not shown. Those skilled in the art will recognize that alternate numbers of stator segments 22 may be used while remaining within the scope of that which is claimed. For instance, a stator assembly 14 having fifteen of thirty stator segments 22 may be used such that the concentrated windings 32 may be connected in three groups of five or three groups of ten, respectively. The use of fifteen stator segments 22 having concentrated windings 32 with a rotor 18 having fourteen magnetic poles will enable three electrical phases while reducing the amount of back iron 26 required to communicate the magnetic flux among the stator segments 22. Further, by employing thirty stator segments 22 in combination with a rotor 18 having 28 magnetic poles, a similar reduction in the amount of back iron 26 may be provided with a generally symmetrical magnetic force.

Figure 3:
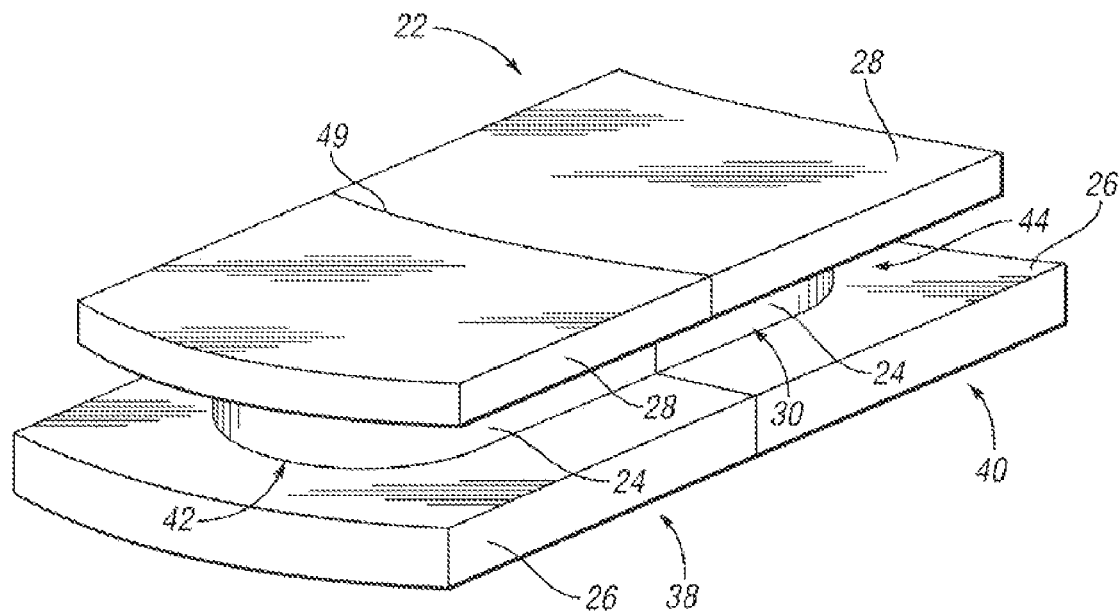
FIG. 3 is a perspective view of a stator segment forming the stator assembly of FIG. 2 and having a first and second end member consistent with the present invention.
Figure 5:
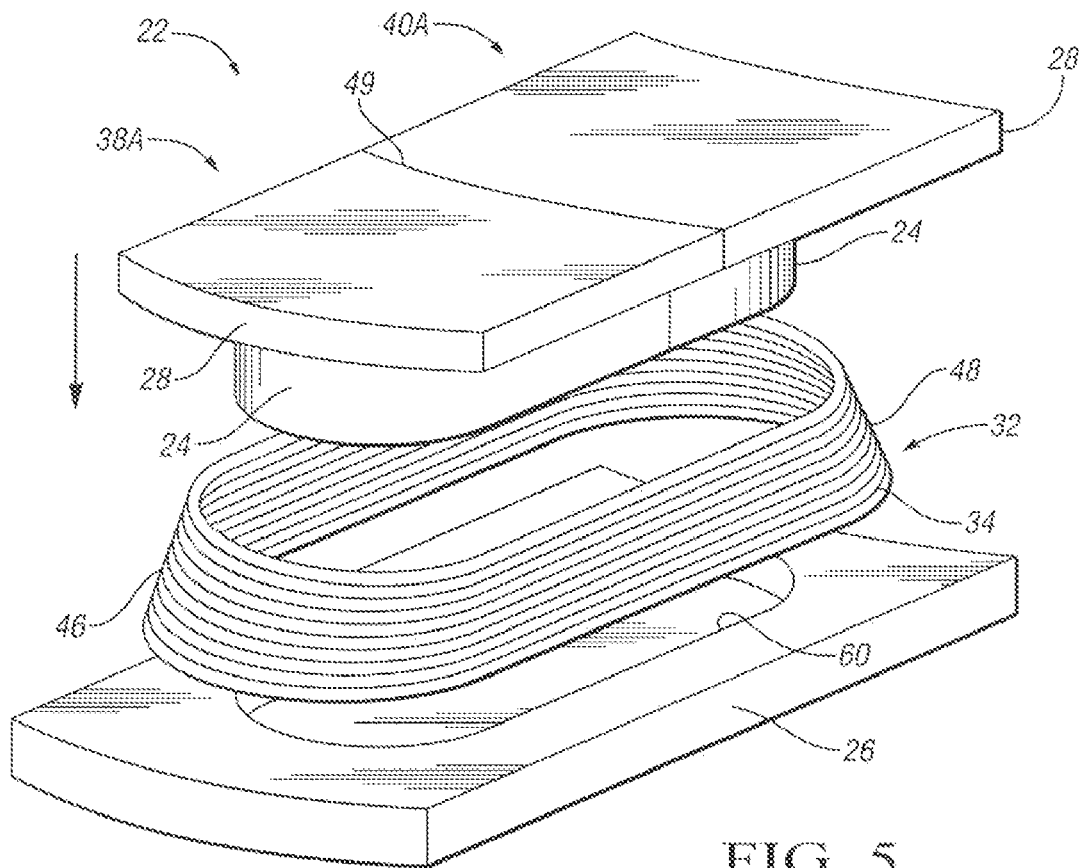
FIG. 5 is an exploded perspective view illustrating a method of assembling the stator segment shown in FIG. 3.

Referring now to FIG. 3, and with continued reference to FIGS. 1 and 2, there is shown stator segment 22 consistent with the present invention. The stator segment 22 is formed from a first end member 38 and a second end member 40. The first and second end members 38 and 40 are preferably pressed from powdered or flaked iron in generally the same direction as the longitudinal axis A of the electric motor 10 such that the first and second end members 38 and 40 are substantially similar. This method of forming the first and second end members 38 and 40 is beneficial in that the first and second end members 38 and 40 may be formed on the same tooling, which may enable a reduction in cost. Each of the first and second end members 38 and 40 includes the stator tooth 24 and at least one of the stator shoe 28 and the back iron 26. At least one of the stator shoe 28 and the back iron 26 extends along the longitudinal axis A of the electric motor 18 a predetermined distance past the stator tooth 24 to define a first and second end portion 42 and 44, respectively, of the cavity 30 described with reference to FIG. 2. The first and second end portion 42 and 44 of cavity 30 are sufficiently configured to receive respective first and second end turns 46 and 48, shown in FIG. 5, of the concentrated windings 32. It should be appreciated that the line of contact or the parting line 49 between the first and second end members 38 and 40 is positioned or oriented in a manner generally perpendicular to the longitudinal axis A of the electric motor 10.

Figure 4:
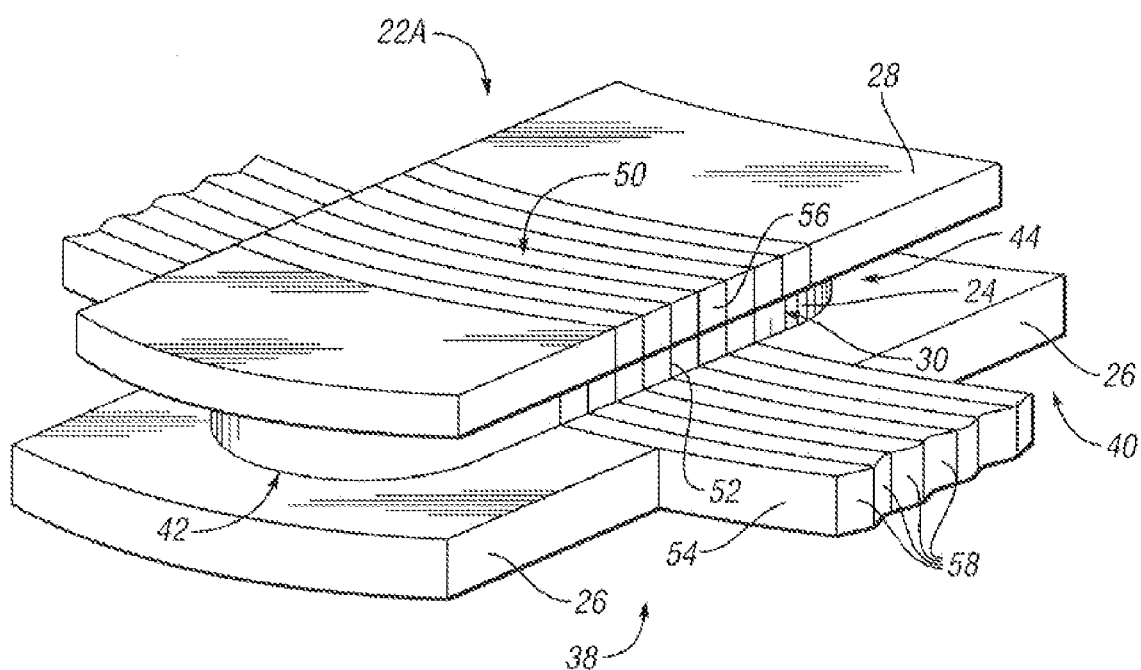
FIG. 4 is a perspective view of a stator segment having the first and second end member shown in FIG. 3 having an intermediate member disposed therebetween.

Referring to FIG. 4, there is shown an alternate embodiment of the stator segment 22, shown in FIG. 3, generally indicated at 22A. The stator segment 22A has at least one generally annular, axially extending intermediate member 50, a portion of which is shown in FIG. 4, disposed between each of the first and second end members 38 and 40. The intermediate member 50 has a stator tooth portion 52 extending generally radially inwardly from a back iron portion 54. Additionally, a stator shoe portion 56 is spaced from the back iron portion 54. It should be appreciated that the stator tooth portion 52 has generally the same or similar cross section to that of the stator teeth 24 of the first and second end members 38 and 40. In addition, it should be appreciated that the back iron portion 54 has generally the same or similar cross section to that of the back iron 26 of the first and second end members 38 and 40. Preferably, the back iron portion 54 of the intermediate member 50 will be continuous as opposed to segmented. That is, the intermediate member 50 will extend in a generally circumferential direction past the first and second end members 38 and 40. Further, the stator shoe portion 56 has generally the same or similar cross section to that of the stator shoes 28 of the first and second end members 38 and 40. The intermediate member 50 is preferably formed from steel laminations 58, as shown in FIG. 4. However, those skilled in the art will recognize that the intermediate member 50 may be pressed from powdered or flaked iron. The stator segment 22A enables the combination of high magnetic flux permeability achievable with the use of laminated steel forming the intermediate member 50 with the insulative properties of powdered or flaked iron forming the first and second end members 38 and 40 to carry magnetic flux in three dimensions with only moderate losses.

Figure 6:
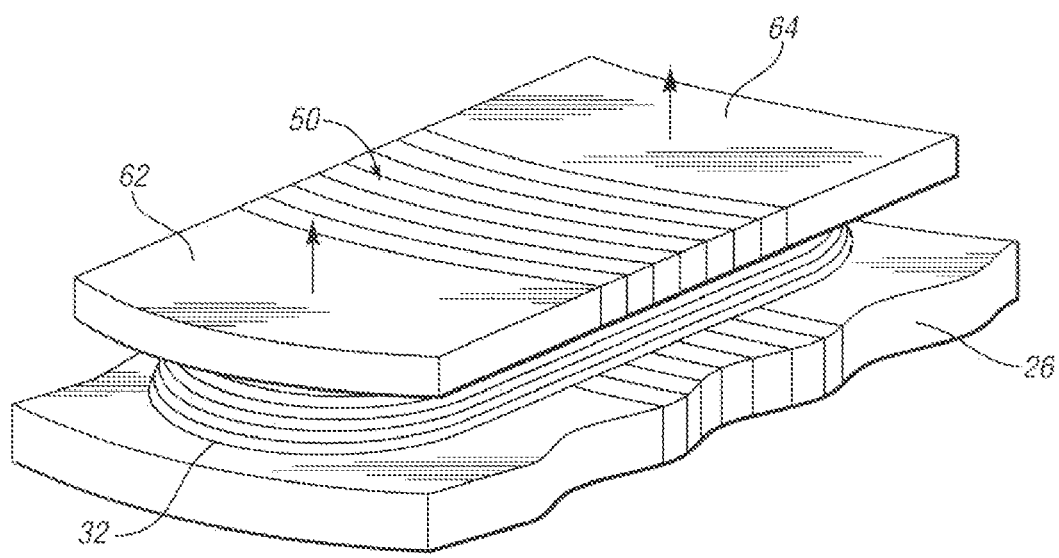
FIG. 6 is a perspective view illustrating a method of assembling the stator segment shown in FIG. 4.

The stator segment 22 may be formed by wrapping the wire 34 around the stator tooth 24 of the stator segment 22 to substantially fill the cavity 30 thereby forming the concentrated windings 32. Alternately, the concentrated windings 32 may be formed, or wound, on a bobbin or mandrel. Subsequently, first and second end members 38A and 40A, each having only a stator tooth 24 and stator shoe 28, are inserted into the formed winding 32. The stator teeth 24 of the first and second end members 38A and 40A are then partially received by an orifice 60 defined by the back iron 26 to complete the stator segment 22. As shown in FIG. 6, the stator segment 22A may be formed by placing first and second removable end dies 62 and 64, respectively, at opposite ends of the intermediate member 50 and thereafter forming the winding 32 around the intermediate member 50 and the first and second removable end dies 62 and 64. Subsequently, the first and second removable end dies 62 and 64 are removed and the first and second end members 38A and 40A, respectively, are inserted in their place to form the completed stator segment 22A. By forming the concentrated windings 32 in this way, the concentrated windings 32 may be coined between the stator shoe 28 and the back iron 26 to reduce the space among the wire 34 without imposing high stresses on the first and second end members 38A and 40A.

While the best modes for carrying out the invention have been described in detail, those familiar with the art to which this invention relates will recognize various alternative designs and embodiments for practicing the invention within the scope of the appended claims.

The invention claimed is:

1. A stator assembly for an electric motor having a longitudinal axis, the stator assembly comprising:
    at least one stator segment having:
        a first end member having a stator tooth and at least one of a stator shoe and a back iron;
        a second end member positioned with respect to said first end member and having a stator tooth and at least one of a stator shoe and a back iron;

a winding generally circumscribing said stator tooth of said first end member and said stator tooth of said second end member;

at least one intermediate member disposed between said first and second end members such that said first and second end members do not abut one another; wherein said at least one intermediate member extends generally circumferentially about the longitudinal axis of the motor and beyond the first and second end members; and wherein said first and second end members face each other along a parting line generally perpendicular to the longitudinal axis of the motor.

2. The stator assembly of claim 1, wherein at least one of said first and second end members are formed from one of pressed powdered iron and pressed flaked iron.

3. The stator assembly of claim 1, wherein said at least one intermediate member is formed from laminated steel.

4. The stator assembly of claim 1, wherein said at least one intermediate member is formed from one of pressed powdered iron and pressed flaked iron.

5. The stator assembly of claim 1, wherein said first and second end members each have said stator shoe and said back iron.

6. The stator assembly of claim 1, wherein said first end member and said second end member are substantially similar.

7. An electric motor having a longitudinal axis, the electric motor comprising:

a housing;

a rotor rotatably disposed with respect to said housing;

a generally annular stator assembly mounted with respect to said housing and coaxially disposed with respect to said rotor;

wherein said stator assembly includes at least one stator segment having:

a first end member having a stator tooth, a stator shoe, and a back iron;

a second end member positioned with respect to said first end member and having a stator tooth, a stator shoe, and a back iron;

a winding generally circumscribing said stator tooth of said first end member and said stator tooth of said second end member;

wherein said first and second end members face each other along a parting line generally perpendicular to the longitudinal axis of the motor; and wherein said back iron of said first and second end members defines an orifice in which said stator tooth of said first and second end members is received.

8. The electric motor of claim 7, further comprising at least one intermediate member disposed between said first and second end members.

9. The electric motor of claim 8, wherein at least one of said first and second end members are formed from one of pressed powdered iron and pressed flaked iron.

10. The electric motor of claim 8, wherein said at least one intermediate member is formed from laminated steel.

11. The electric motor of claim 8, wherein said at least one intermediate member extends in a generally circumferential direction about the longitudinal axis of the motor beyond said first and second end members.

12. The electric motor of claim 8, wherein said at least one intermediate member is formed from one of pressed powdered iron and pressed flaked iron.

13. The electric motor of claim 7, wherein said first end member and said second end member are substantially similar.

* * * * *